United States Patent
McMahon

(10) Patent No.: US 11,060,501 B1
(45) Date of Patent: Jul. 13, 2021

(54) TURBOVANE WIND TURBINE

(71) Applicant: Elihu McMahon, Bronx, NY (US)

(72) Inventor: Elihu McMahon, Bronx, NY (US)

(*) Notice: Subject to any disclaimer, the term of this patent is extended or adjusted under 35 U.S.C. 154(b) by 904 days.

(21) Appl. No.: 13/753,142

(22) Filed: Jan. 29, 2013

Related U.S. Application Data

(60) Provisional application No. 61/592,342, filed on Jan. 30, 2012.

(51) Int. Cl.
*F03D 3/00* (2006.01)
*F03D 3/04* (2006.01)

(52) U.S. Cl.
CPC ............... *F03D 3/002* (2013.01); *F03D 3/04* (2013.01)

(58) Field of Classification Search
CPC ........ F03D 3/002; F03D 3/0463; F03D 3/005; F03D 3/04–3/049; F03D 9/35; F03D 9/39
USPC .......................... 415/2.1, 58.2–58.4, 148, 224
See application file for complete search history.

(56) References Cited

U.S. PATENT DOCUMENTS

| | | | | |
|---|---|---|---|---|
| 4,084,918 A * | 4/1978 | Pavlecka | ................... | F03D 1/04 415/1 |
| 5,083,899 A * | 1/1992 | Koch | ................... | F03D 3/0481 415/2.1 |
| 5,332,354 A * | 7/1994 | Lamont | ................. | F03D 3/0463 415/2.1 |
| 5,463,257 A * | 10/1995 | Yea | ....................... | F03D 3/0418 290/55 |
| 6,158,953 A * | 12/2000 | Lamont | ................. | B64C 11/007 415/125 |
| 6,191,496 B1 * | 2/2001 | Elder | .................... | F03D 3/0409 290/55 |
| 6,655,907 B2 * | 12/2003 | Brock | ..................... | F03D 3/002 415/4.2 |
| 7,744,338 B2 * | 6/2010 | DeRuyter | ............ | F03D 3/0454 415/2.1 |
| 7,744,339 B2 * | 6/2010 | Flores Lumbreras | .... | F03D 3/02 290/44 |
| 8,257,020 B2 * | 9/2012 | Graham, Sr. | ........... | F03D 3/002 415/4.3 |
| 2002/0110453 A1 * | 8/2002 | Hopkins | .................. | F03D 1/04 415/202 |
| 2006/0140748 A1 * | 6/2006 | Raziel | ....................... | F03D 1/04 415/4.1 |
| 2010/0329841 A1 * | 12/2010 | O'Neil | .................... | F03D 3/002 415/4.1 |

\* cited by examiner

*Primary Examiner* — Kenneth Bomberg
*Assistant Examiner* — Julian B Getachew
(74) *Attorney, Agent, or Firm* — Gottlieb, Rackman & Reisman, PC

(57) ABSTRACT

A wind turbine uses a series of airfoils/vanes that rotate in a vertical plane within a specifically designed housing. The housing has several adjustable surfaces that control airflow patterns within the housing to increase wind velocity through a vortex effect.

9 Claims, 8 Drawing Sheets

TURBOVANE WIND TURBINE

RELATED APPLICATIONS

This application claims priority of U.S. Provisional Application No. 61/592,342 filed Jan. 30, 2012.

FIELD OF THE INVENTION

This invention pertains to a wind turbine, and in particular to specially designed housings to increase the efficiency of the turbine.

BACKGROUND OF THE INVENTION

Two wind energy studies, one by MIT and the other by Stanford University, have established that there is enough wind in the United States of America to produce electrical energy, so that its dependence on fossil fuel would be greatly reduced.

Thus the carbon footprint in the US could be significantly reduced. This use of wind power for electrical energy production would contribute in a positive manner to the reduction of global warming. Also the present use of propeller driven wind turbines has several major drawbacks:

1. The propellers must have very large diameters to capture enough wind;
2. Propellers are very massive;
3. Relatively high winds are needed to cause rotation of the propellers;
4. High gearing ratios are required for the generator, since the propellers rotate at a very slow rate; therefore much of the energy from the wind is lost for conversion to electrical power.

The above-mentioned drawbacks can be overcome by designing a wind turbine that has lightweight rotors that will produce high rotational speed and high torque at relatively low wind speeds.

U.S. Pat. No. 7,748,947 describes a wind turbine for generating electricity that includes a housing secured atop a tower. The turbine consists of paddles radiating from a horizontal hub. The '947 patent is concerned with shielding the paddles from gusts of wind that might overtorque the system. This is accomplished by having a wind shield rise up to prevent winds passing over the front of the housing from reaching the paddles.

U.S. Pat. No. 5,472,311 provides a housing for a wind turbine that has a housing surface contoured to create a venturi action so that there is reduced pressure on a portion of a vane assembly, thereby causing a draft that causes the vanes in the assembly to rotate.

Further patents utilize housings to control the airflow past vanes that drive a turbine. Representative examples are U.S. Pat. No. 7,256,512 ("Variable Aperture Velocity Augmented Ducted Fan Wind Turbine"), U.S. Pat. No. 7,728,455 ("Parabolic Bi-Directional Wind Turbine Assembly and Omni-Directional Power Array"), U.S. Pat. No. 5,332,354 ("Wind Turbine Apparatus" with closable inlet and outlet openings aligned with the prevailing wind direction), and U.S. Pat. No. 7,758,299 U.S. Pat. No. ("Wind Turbine Assembly" with adjustable shutters to control the amount of wind reaching the turbine blades).

None of the prior art devices realize the efficiency that can be achieved by creating a vortex zone in the air flow pattern.

BRIEF DESCRIPTION OF THE INVENTION

The following describes a novel wind turbine that uses a series of airfoils/vanes that that utilize the Bernoulli principle to cause the rotor to turn. The airfoils, which are attached to an airfoil frame, rotate in a vertical plane within a specially designed housing. The housing may have several fixed radial surfaces or adjustable surfaces that control airflow patterns through the housing.

The leading plane surface of the housing, which can be adjusted through various angles, causes the airfoil to "see" a wind speed greater than the actual wind speed. A vortex effect is created within the lower part of the air chamber by the low pressure that develops at the end of the inclined plane and will create a vortex in the lower quadrants of the. radial housing chamber that enhances the forward rotation of the airfoils in that region. The vortex created refers to the loop in the wind pattern and does not relate to any particular gross circular rotation of the apparatus.

This innovative wind turbine design permits the capture of surface wind as well as high elevation wind. Due to its unique design very tall mounting structures are not required. The turbine may be mounted on any existing elevated structure, natural or man-made. The close proximity of this design to the site where it is mounted eliminates the need for long distance power transmission lines and thus lowers electrical power losses and greater cost benefits are realized. The wind turbine may be utilized in areas where there is "artificial wind". For example at the end of a mineshaft, a tunnel or on moving vehicles such as cars, trucks, trains, etc. This apparatus may be activated by another working fluid, such as water.

DETAILED DESCRIPTION OF A PREFERRED EMBODIMENT OF THE INVENTION

Figure 1:
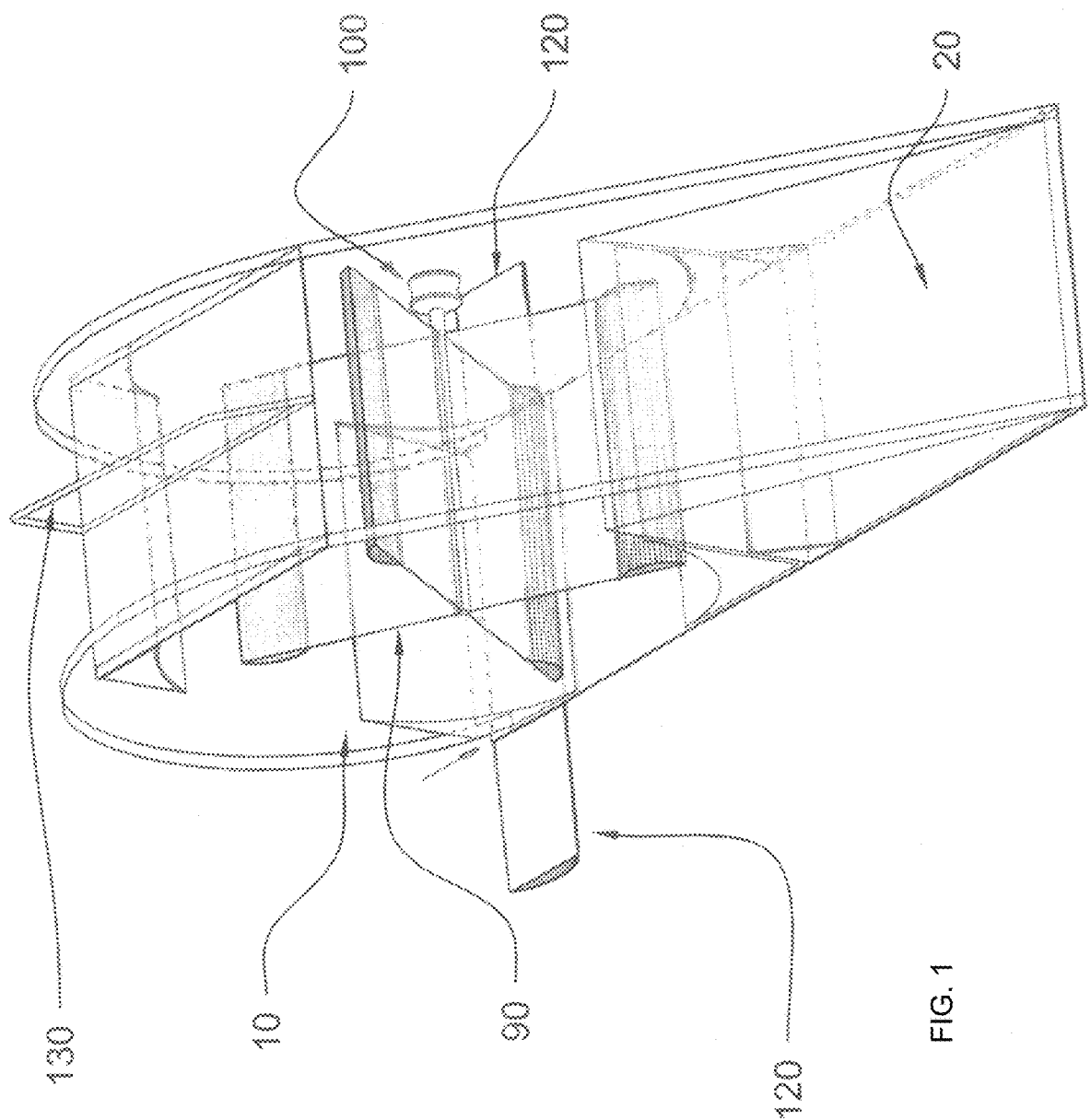
FIG. 1 is a perspective view of the invention.
Figure 2:
FIG. 2 is a cut away view from the right side of the embodiment pictured in FIG. 1
Figure 3:
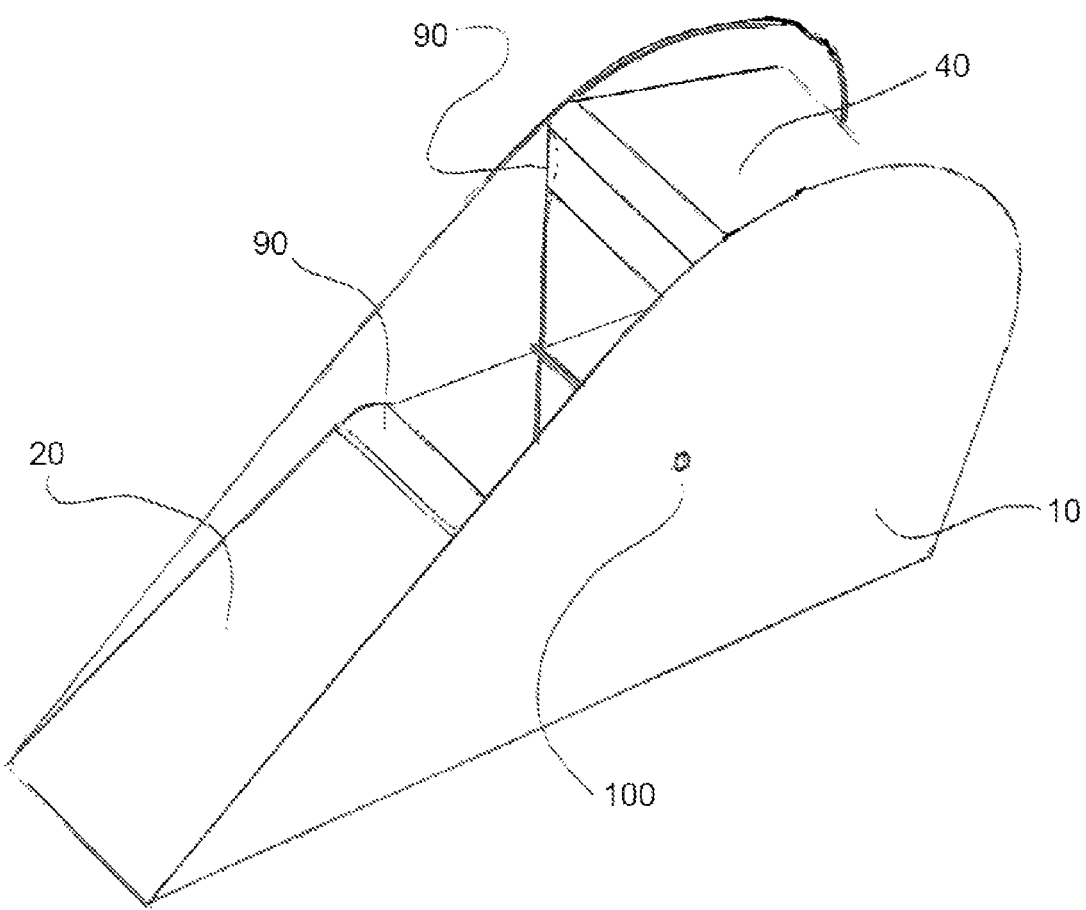
FIG. 3 is a perspective side view of an embodiment.
Figure 4:
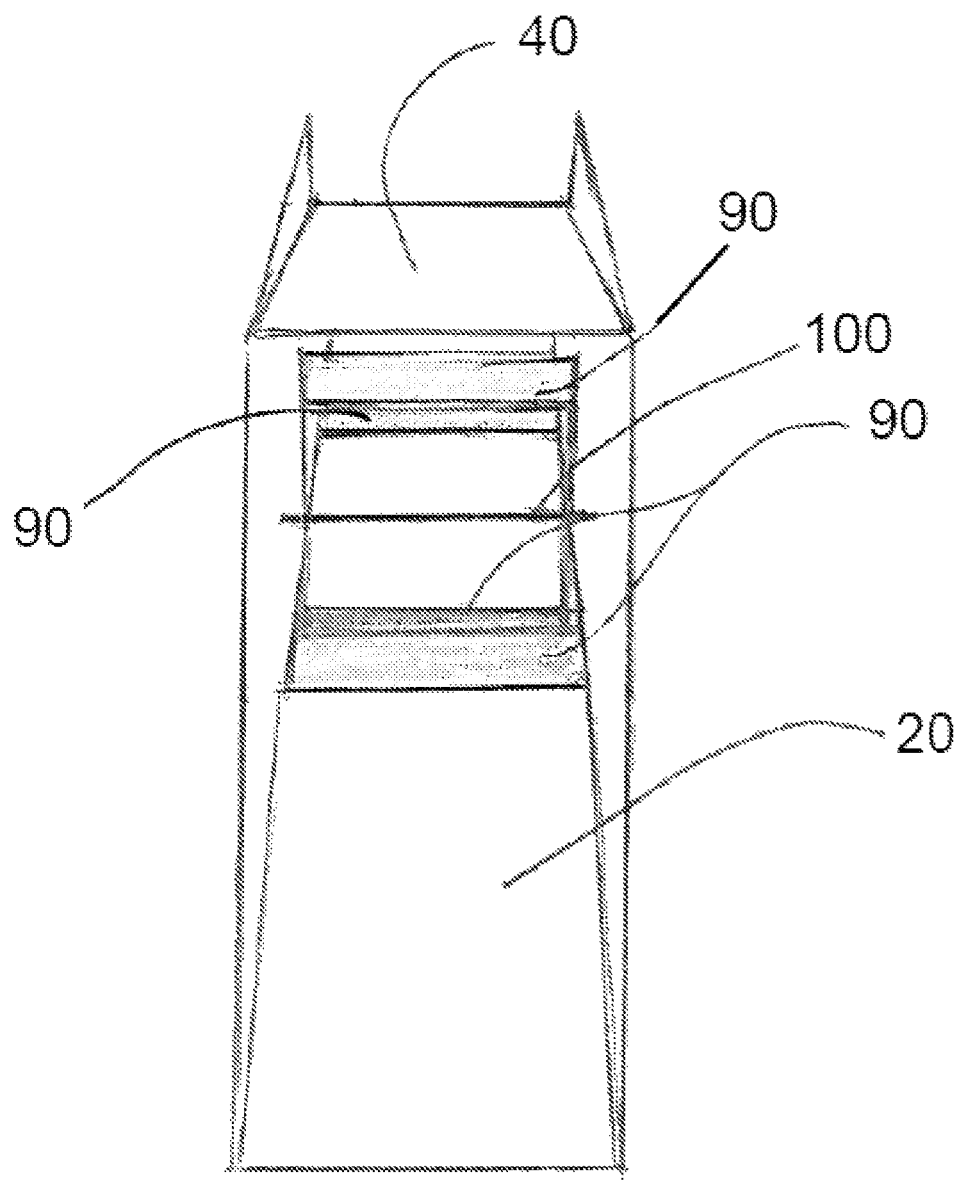
FIG. 4 is a plan view looking down on an embodiment
Figure 5:
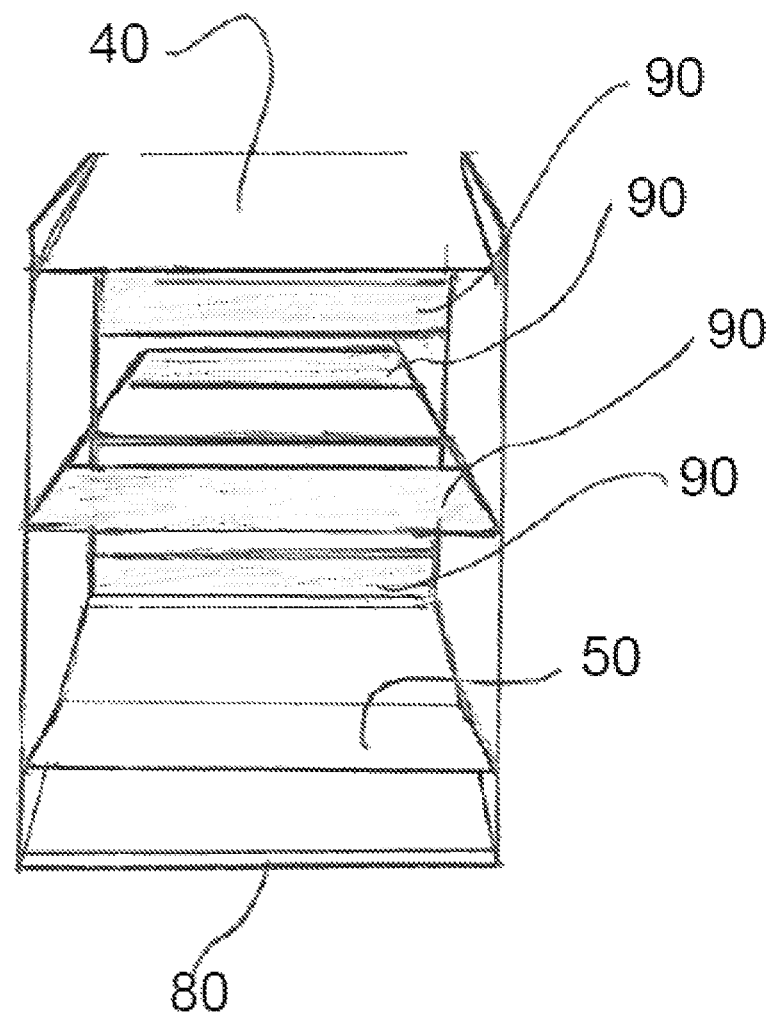
FIG. 5 is a plan view of the rear of an embodiment

The invention is termed a Turbovane (TV). The Turbovane is a fluid activated aerodynamic/streamlined device. For descriptive purposes the working fluid is air, although other fluids, including water, may function as well or better. As depicted in FIGS. 1, 2 and 3, the Turbovane comprises a housing 10 with a forward plane surface 20 that is set at a predetermined angle or has variable angle capability.

The housing 10 a slanted fixed upper surface with a radial wedge 30 at its end or variable angle flaps to alter airflow patterns within the air chamber.

Air enters the housing by riding up the plane surface 20 and exits through a space defined by the slanted fixed upper surface radial wedge 40 or an adjustable angle flap and lower rear radial wedge 50 or adjustable angle flap.

The housing thus has radial wedges at the rear of the air chamber that have substantial curved surfaces.

Figure 6:
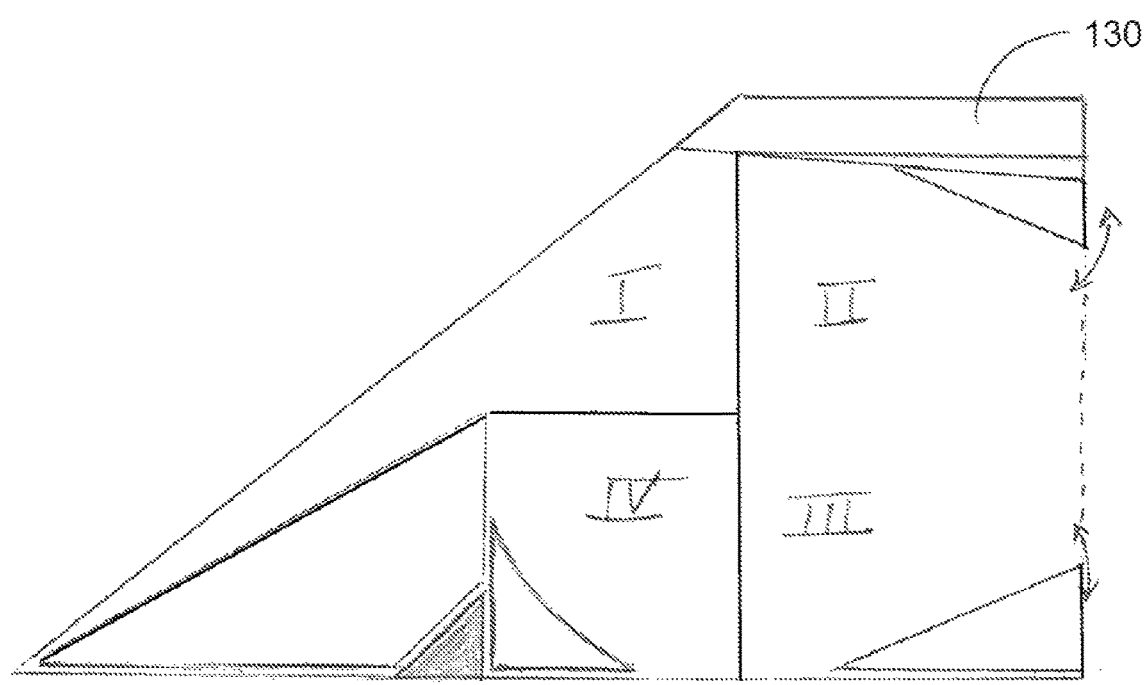
FIG. 6 is a side view of an embodiment including a biased rudder
Figure 7:
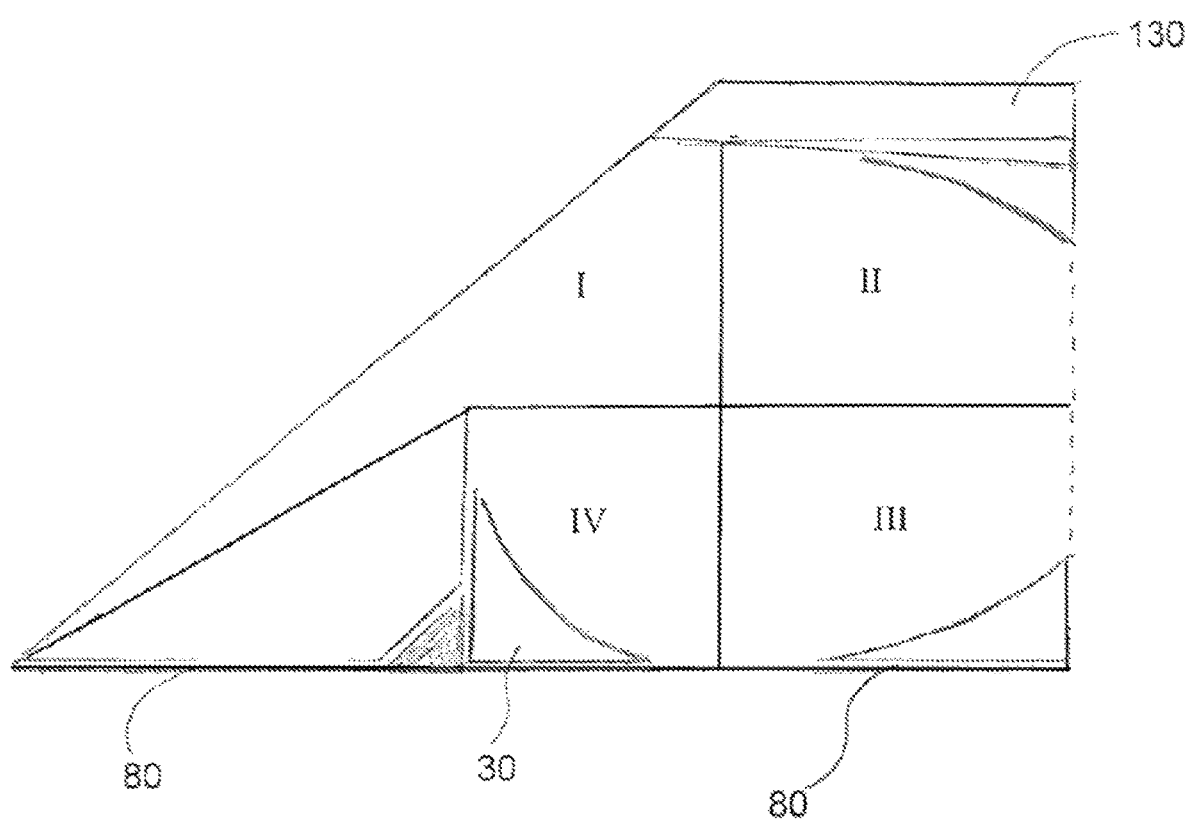
FIG. 7 is a side view of an embodiment having variable rear flaps.

Referring to FIGS. 6 and 7, the housing has a forward radial wedge 30 in quadrant IV and the lower rear radial wedge or adjustable flap 50 in quadrant III that face each other so that low pressure created at the top of the forward radial wedge in quadrant IV causes a loop air pattern 60 in quadrant III and IV to develop. This fluid flow loop that predominates is referred to as the vortex.

The housing has air channels 70 in front of the radial wedge in quadrant IV and 80 below the lower rear radial wedge or adjustable angle flap in quadrant III.

The housing has a radius of curvature of the forward radial wedge in quadrant IV slightly larger than the radius of the rotating airfoils 90.

The portion of the rotor in the vortex zone 60 has substantially less drag and thus the rotational efficiency is enhanced. Air channels 70, 80 are placed in front of the forward radial wedge and below the lower rear radial wedge or flap to enhance the creation of the vortex.

The housing may have flaps or shutters that may be installed at the front of the Turbovane to shut down the turbine during inclement weather conditions.

The air in this vortex zone 60 is driven by the incoming air stream and causes a greater efficiency in the driving of turbine blades 90 set onto a horizontal axis 100 so that the blades extend into the upper portion of the vortex zone. In this way the lower portion of the blades is in a stronger air current than the upper portion of the blades and the blades rotate. In an embodiment, as shown in FIG. 2, an airfoil vane/turbine blade 90 includes a first side and a second side disposed opposite to the first side; the first side extends convexly and the second side is at least partially planar. An airfoil/frame assembly 110 comprising louvers may be used to deflect the airflow away from the upper side of the blades.

Thus the invention may be embodied in a housing with several fixed or adjustable internal surfaces to control fluid flow patterns through the housing; a housing with a multiplicity of adjustable flaps on its forward upper surface, a housing with an internal radial chamber to produce a vortex in which the airflow pattern is reversed at the lower part of the radial chamber (quadrants III and IV); a housing with fixed radial wedges in quadrants II, III and IV or adjustable flaps in quadrants II and III in an embodiment of this invention.

A further characterization of the invention is a fluid activated device that has at least one vertically rotating counter balanced airfoil or multiplicity of airfoils that can be mechanically or electronically adjusted in quadrants I, II and III so that the lift vector of each airfoil is maintained perpendicular to the path of the air entering the turbine.

In addition, the fluid activated device of the present invention may comprise two large diameter gears or pulleys attached to each side of the horizontal shaft of the vertically rotating frame of the airfoils. A belt from these gears or pulleys to the generator or other energy transforming device increase the turbine mechanical advantage to these units.

Figure 8:
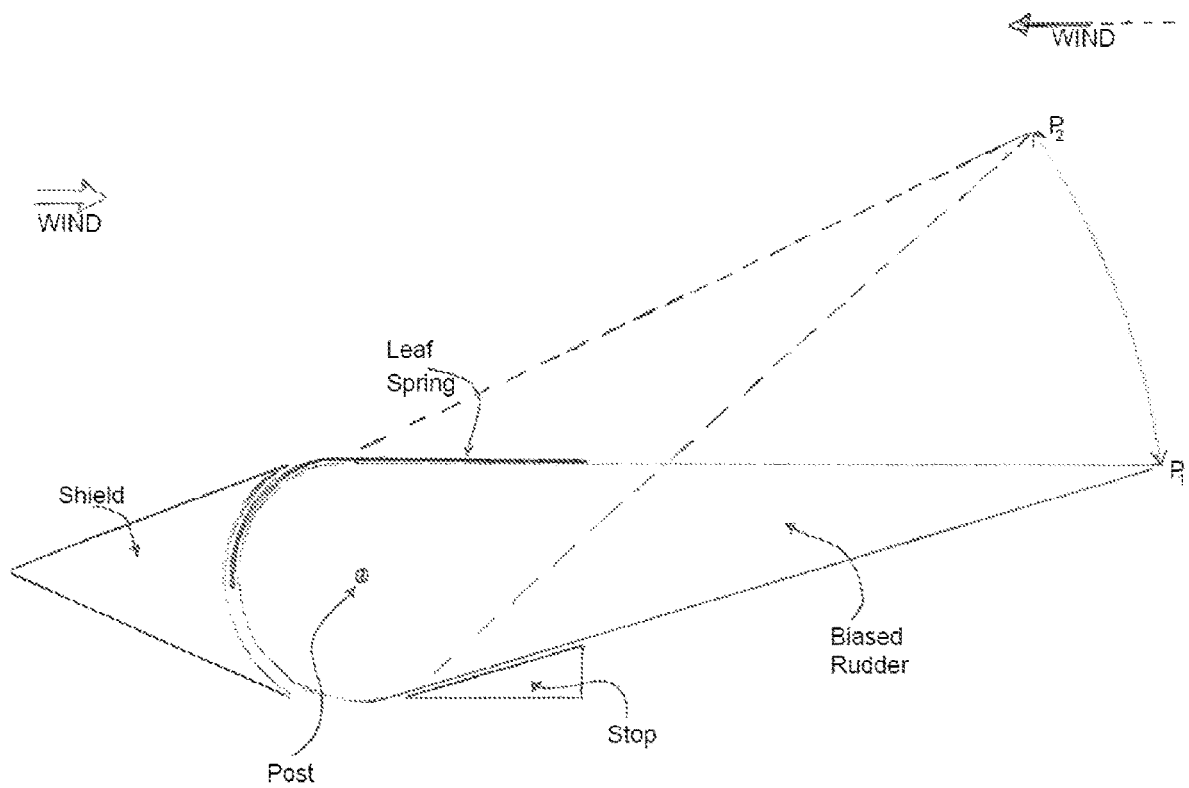
FIG. 8 is a side view of the Biased rudder of an embodiment.

Two variable angle external horizontal stabilizers 120 at the lower rear of the housing will reduce stress on the vertical support shaft of the Turbovane by jibing during high wind conditions. The housing has a vertical biased rudder 130 shown in FIG. 8 on its upper rear surface to rotate the Turbovane so that its forward inclined plane will be oriented into the oncoming wind.

A housing with an internal heater in the generator zone will heat the various surfaces of the turbine. It should be noted that this invention is not limited to wind/electrical use only and may be coupled to other energy transforming devices.

Although the invention has been described in terms of particular embodiments, the invention is broader as encompassed in the claims that follow. To implement the invention persons of skill in the art may now see variations that follow from the invention, but still remain encompassed by the claims.

The invention claimed is:

1. A wind turbine receiving an air inflow, the wind turbine comprising:

a housing including a leading plane surface extending at an incline from a base of the housing, a plurality of surfaces that are spaced from each other within the housing and configured to provide a loop in the air inflow, a vertically biased rudder and a plurality of airfoil vanes that are rotatable about a central axis in a vertical plane, wherein the plurality of surfaces includes a first radial wedge, one of a second radial wedge and a first adjustable flap that is spaced from the first radial wedge, and one of a third radial wedge and a second adjustable flap that is spaced from the first radial wedge and the one of the second radial wedge and the first adjustable flap, at least the first radial wedge having a concave surface as viewed from the central axis that is configured to be contactable with air, wherein the plurality of airfoil vanes includes a first airfoil vane that has a first side that extends at least in part convexly and a second side that is disposed opposite to the first side and is at least partially planar;

wherein the wind turbine encompasses four volume quadrants including quadrant I, quadrant II, quadrant III, and quadrant IV arranged such that quadrant I is located at an entrance into an interior of the turbine and the other of the four volume quadrants are arranged numerically in a clockwise orientation following the quadrant I, the first radial wedge is disposed in the quadrant IV, the one of the second radial wedge and the first adjustable flap is disposed in the quadrant III and the one of the third radial wedge and the second adjustable flap is disposed in the quadrant II to assist in development of a vortex in the quadrant III and the quadrant IV, and wherein the first radial wedge is disposed between the leading plane surface and the one of the second radial wedge and the first adjustable flap.

2. The wind turbine according to claim 1, wherein the housing includes a first exterior panel with the second adjustable flap disposed adjacent to the first exterior panel inside of the housing, wherein the second adjustable flap includes a flat portion, facing the airfoil vanes, that can be adjusted through various angles with respect to the first panel to control an airflow pattern through the housing.

3. The wind turbine according to claim 2, wherein the housing further includes a second exterior panel disposed opposite to the first exterior panel, wherein the first adjustable flap is disposed adjacent to the second exterior panel inside of the housing, and wherein the first adjustable flap comprises a forward inclined plane that can be adjusted through various angles with respect to the second exterior panel.

4. The wind turbine according to claim 1, further comprising an energy transforming device mechanically interacting with the plurality of airfoil vanes.

5. The wind turbine according to claim 4, wherein the energy transforming device is a generator configured to produce electric current.

6. The wind turbine according to claim 1, wherein the leading plane surface comprises a forward inclined plane that has a fixed angle.

7. The wind turbine according to claim 6, wherein the leading plane surface is adapted to cause an acceleration of the ambient air flow through the housing.

8. The wind turbine according to claim 1, wherein the housing includes an exterior panel and an air channel extending between the exterior panel of the housing and the first radial wedge.

9. The wind turbine according to claim 1, wherein the housing includes an exterior panel and an air channel extending between the exterior panel of the housing and the one of the second radial wedge and first adjustable flap.

* * * * *